United States Patent
Dominowska et al.

(10) Patent No.: US 7,574,408 B2
(45) Date of Patent: Aug. 11, 2009

(54) PUBLISHER UNIONS

(75) Inventors: Ewa Dominowska, Kirkland, WA (US); Christopher A. Meek, Kirkland, WA (US); David M. Chickering, Bellevue, WA (US); Jody D. Biggs, Redmond, WA (US); Brian Burdick, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/418,899

(22) Filed: May 5, 2006

(65) Prior Publication Data

US 2007/0260617 A1 Nov. 8, 2007

(51) Int. Cl.
*G06F 17/30* (2006.01)
(52) U.S. Cl. .................................................... 705/408
(58) Field of Classification Search ............... 705/404, 705/408; 707/100
See application file for complete search history.

(56) References Cited

U.S. PATENT DOCUMENTS

| | | | | |
|---|---|---|---|---|
| 5,319,562 A * | 6/1994 | Whitehouse | ............... | 705/403 |
| 5,848,396 A | 12/1998 | Gerace | | |
| 6,178,412 B1 * | 1/2001 | Ratzenberger et al. | ...... | 705/408 |
| 6,285,987 B1 | 9/2001 | Roth | | |
| 6,324,519 B1 | 11/2001 | Eldering | | |
| 6,502,077 B1 | 12/2002 | Speicher | | |
| 6,513,052 B1 | 1/2003 | Binder | | |
| 6,618,709 B1 * | 9/2003 | Sneeringer | ................... | 705/412 |
| 6,836,762 B2 | 12/2004 | Speicher | | |
| 6,848,542 B2 | 2/2005 | Gailey et al. | | |
| 6,868,395 B1 * | 3/2005 | Szlam et al. | ................... | 705/27 |
| 6,895,387 B1 | 5/2005 | Roberts et al. | | |
| 6,938,018 B2 * | 8/2005 | Shah et al. | ..................... | 705/62 |
| 6,959,298 B1 * | 10/2005 | Silverbrook et al. | .......... | 707/10 |
| 2001/0047297 A1 | 11/2001 | Wen | | |
| 2002/0013757 A1 | 1/2002 | Bykowsky et al. | | |
| 2002/0161639 A1 | 10/2002 | Goldstein | | |
| 2002/0174009 A1 | 11/2002 | Myers et al. | | |
| 2003/0120666 A1 * | 6/2003 | Tacaille et al. | .............. | 707/100 |
| 2003/0220830 A1 | 11/2003 | Myr | | |
| 2004/0002967 A1 * | 1/2004 | Rosenblum et al. | ............ | 707/3 |
| 2004/0083190 A1 * | 4/2004 | Sanders | ...................... | 705/404 |

(Continued)

OTHER PUBLICATIONS

Federated Media Helps Leading Independent Authors Turn Their Publications Into Sole-Proprietor Media Businesses, website, printed Feb. 2, 2006, 2 Pages, http://fmpub.net/about/.

(Continued)

*Primary Examiner*—Don Wong
*Assistant Examiner*—Kim T Nguyen
(74) *Attorney, Agent, or Firm*—Shook, Hardy & Bacon LLP

(57) ABSTRACT

A publisher union comprises a plurality of publishers, a channel, and a publisher union administrator. The publisher union is administered by receiving a channel proposal, determining whether the channel proposal is acceptable, forming a channel, and presenting the channel for monetization. User information is gathered by the publisher union by establishing a domain, collecting user information, aggregating the user information, and providing the aggregated user information to publisher union members.

19 Claims, 4 Drawing Sheets

U.S. PATENT DOCUMENTS

| | | | |
|---|---|---|---|
| 2004/0103024 A1 | 5/2004 | Patel et al. | |
| 2004/0139088 A1* | 7/2004 | Mandato et al. | 707/100 |
| 2004/0167816 A1 | 8/2004 | Kamath | |
| 2004/0181537 A1* | 9/2004 | Chawla et al. | 707/100 |
| 2005/0005242 A1 | 1/2005 | Hoyle | |
| 2005/0044061 A1* | 2/2005 | Klemow | 707/1 |
| 2005/0083906 A1 | 4/2005 | Speicher | |
| 2006/0031235 A1* | 2/2006 | Foresti et al. | 707/100 |
| 2006/0036679 A1* | 2/2006 | Goodman et al. | 709/203 |
| 2006/0085450 A1* | 4/2006 | Seubert et al. | 707/100 |
| 2006/0212698 A1 | 9/2006 | Peckover | |
| 2007/0179856 A1 | 8/2007 | O'Kelley | |
| 2007/0239527 A1* | 10/2007 | Nazer et al. | 705/14 |

OTHER PUBLICATIONS

Jaymee Johnson, Ad Creative or Media Placement Which is more important when optimizing online direct response campaigns? Atlas Institute printout, 3 pages, http://www.lab.net/resources/pdf/CreativePlacements.pdf. (May 5, 2006).

We Power Results, website, printed Jan. 6, 2006, 2 pages, http://www.mainstreamadvertising.com/advertising-about.html.

Sara Robinson, Computer Scientists Optimize Innovative Ad Auction, SIAM News, vol. 38, No. 3, Apr. 2005, 3 pages, http://www.CS.berkeley.edu/-vazirani/pubs/siam.pdf.

Nate Elliott and Niki Scevak, The Art of Online Campaign Tracking, Why is campaign tracking so important? Online advertising through 2009 (JupiterResearch Vision Report, Jul. 2004, 8 pages, Sane Solutions, LLC, http://www.eglobal.co.nz/tracking.pdf.

* cited by examiner

PUBLISHER UNIONS

CROSS-REFERENCE TO RELATED APPLICATIONS

The contents of the patent application entitled "A Distributed Architecture For Online Advertising," filed on the same day herewith, are incorporated herein by reference.

STATEMENT REGARDING FEDERALLY SPONSORED RESEARCH OR DEVELOPMENT

Not applicable.

BACKGROUND

Currently, content publishers typically individually negotiate advertising arrangements to monetize the publishers' content. For example, a publisher enters into an agreement to display an advertisement in exchange for payment from the advertiser. The publisher may want to specify that only particularly relevant advertisements or that advertisements with a minimum click-through rate are displayed. While advertisers can similarly individually negotiate such advertising agreements, advertisers are increasingly joining advertiser networks such as Google's AdSense and have long had the ability to hire a representative to negotiate the advertising arrangement on their behalf. Joining an advertising network allows advertisers to harness the negotiating strength of a large and powerful organization that may combine advertisements from hundreds or even thousands of other advertisers into a single advertisement supply entity with which individual publishers must negotiate. In the example above, an advertiser network or representative may have enough leverage during negotiation to frustrate the individual publisher's goals.

FIG. 1 is a diagram of relationships between advertisers and individual publishers. Arrangement 500 is illustrated in which publishers 502 and 512 may negotiate advertising agreements with advertisers 504, 514, 516, 518, and 508. Publishers 502 and 512 individually negotiate directly with advertiser 504. Because advertisers 514, 516, and 518 joined advertiser network 506, publishers 502 and 512 individually negotiate with advertiser network 506 to supply advertisements from advertisers 514, 516, and 518. Because advertiser 508 hired advertiser representative 510, publishers 502 and 512 negotiate individually with advertiser representative 510 to receive advertisements from advertiser 508.

In the current advertising environment, publishers lack the ability to effectively organize together to improve their negotiating position.

SUMMARY

The present invention generally relates to organizing publishers into publisher unions. A plurality of publishers group together, appoint a publisher union administrator, and form channels based on common characteristics. New channels are suggested using channel proposals, and if determined to be acceptable, are formed and presented for monetization. User information may be gathered by the publisher union by establishing a domain, collecting user information, aggregating the user information, and providing the aggregated user information to publisher union members.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
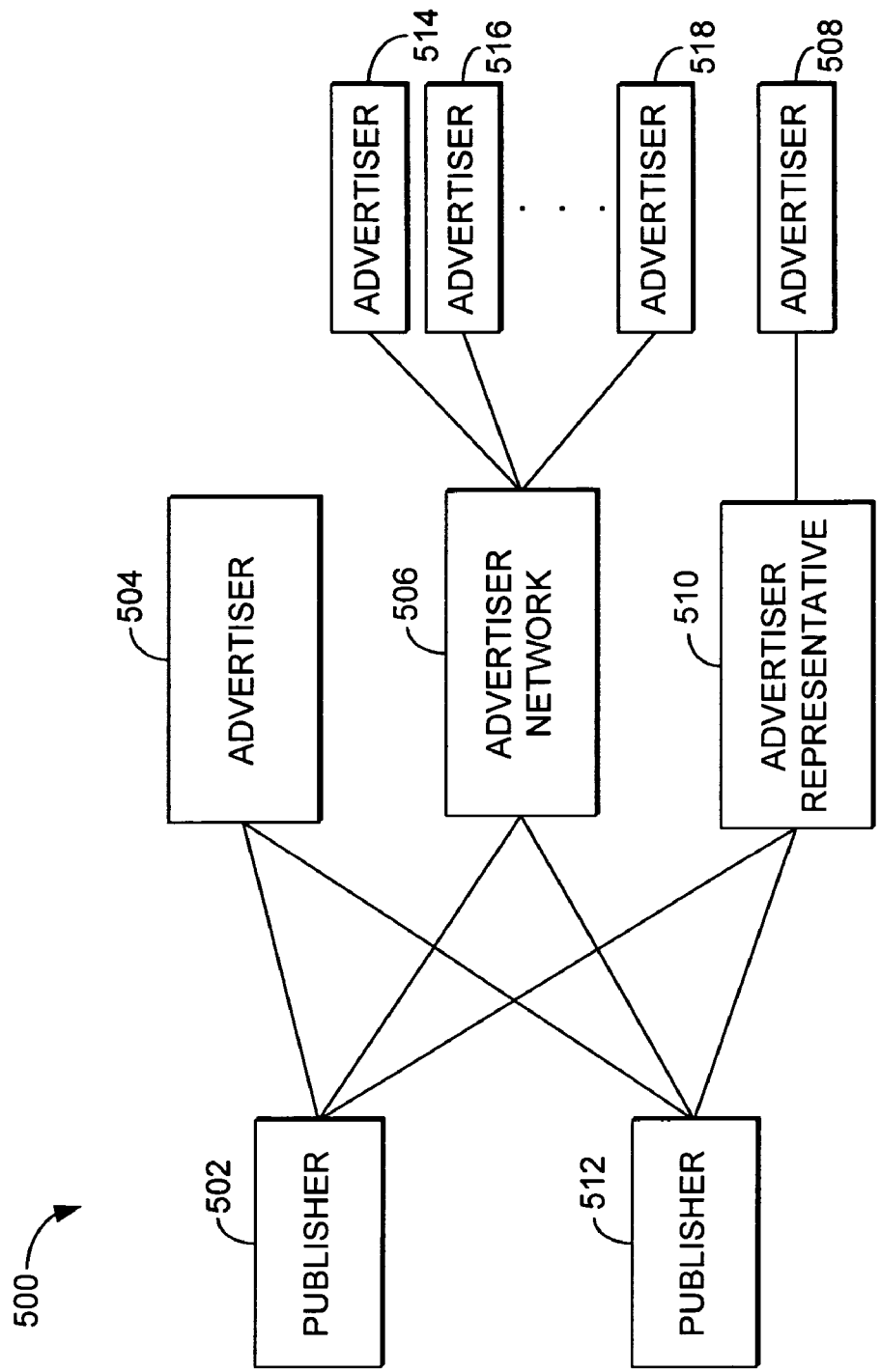
FIG. 1 is a diagram of relationships between advertisers and individual publishers.
Figure 2:
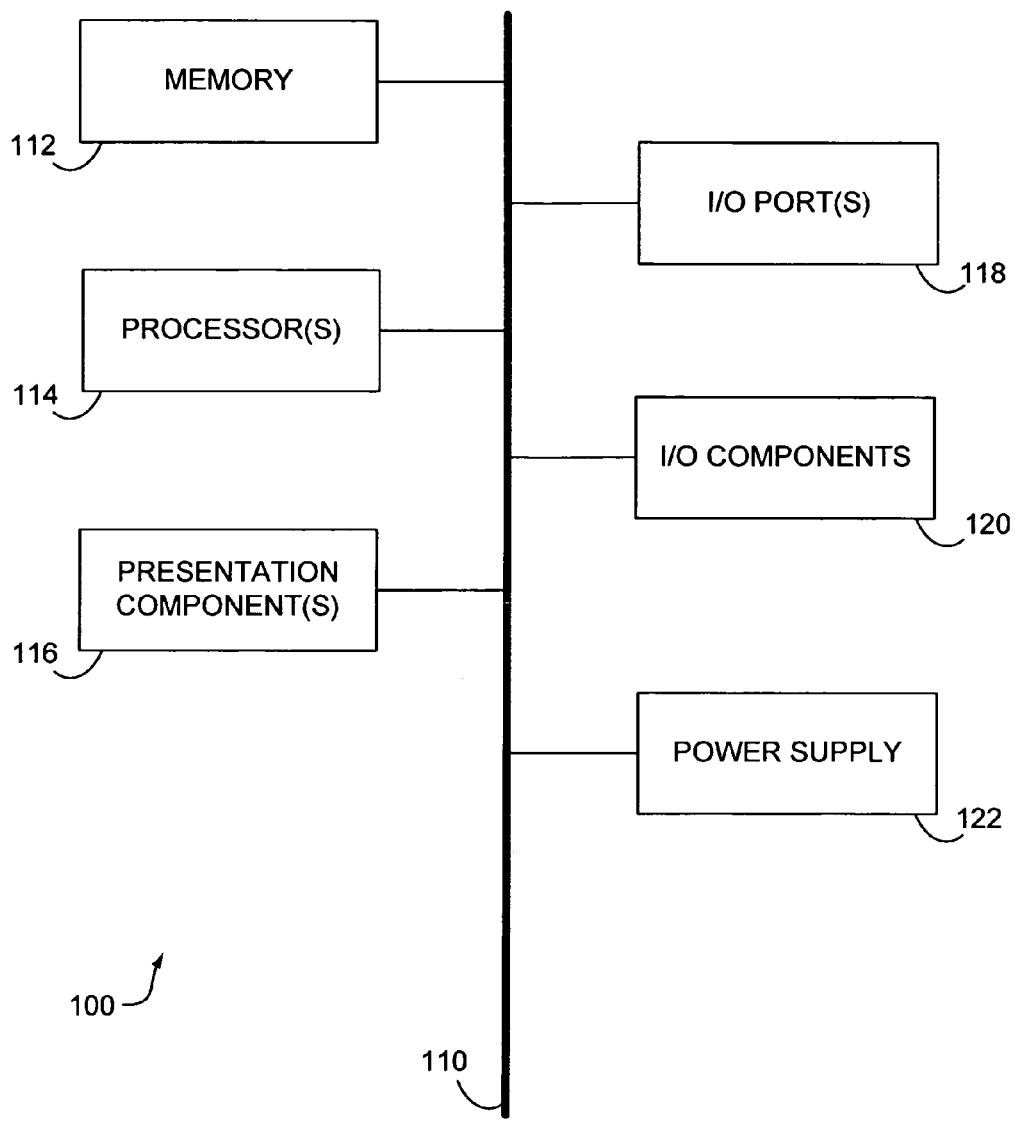
FIG. 2 is a block diagram of a computing system environment suitable for use in implementing the present invention.

Referring initially to FIG. 2 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 2, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 2 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 2 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

In embodiments of the present invention, publishers group together in publisher unions and establish channels within the publisher unions based on at least one common characteristic. Publisher union administrators present the channels to advertisers for monetization. In an embodiment, the publisher union administrators guarantee a minimum click-through rate. As a result, publishers in the publisher unions are not left to individually negotiate with advertisers, advertiser networks, and advertiser representatives. One advantage of the publisher unions is that the publishers are able to achieve more favorable advertising agreements by increasing their pricing power.

Figure 3:
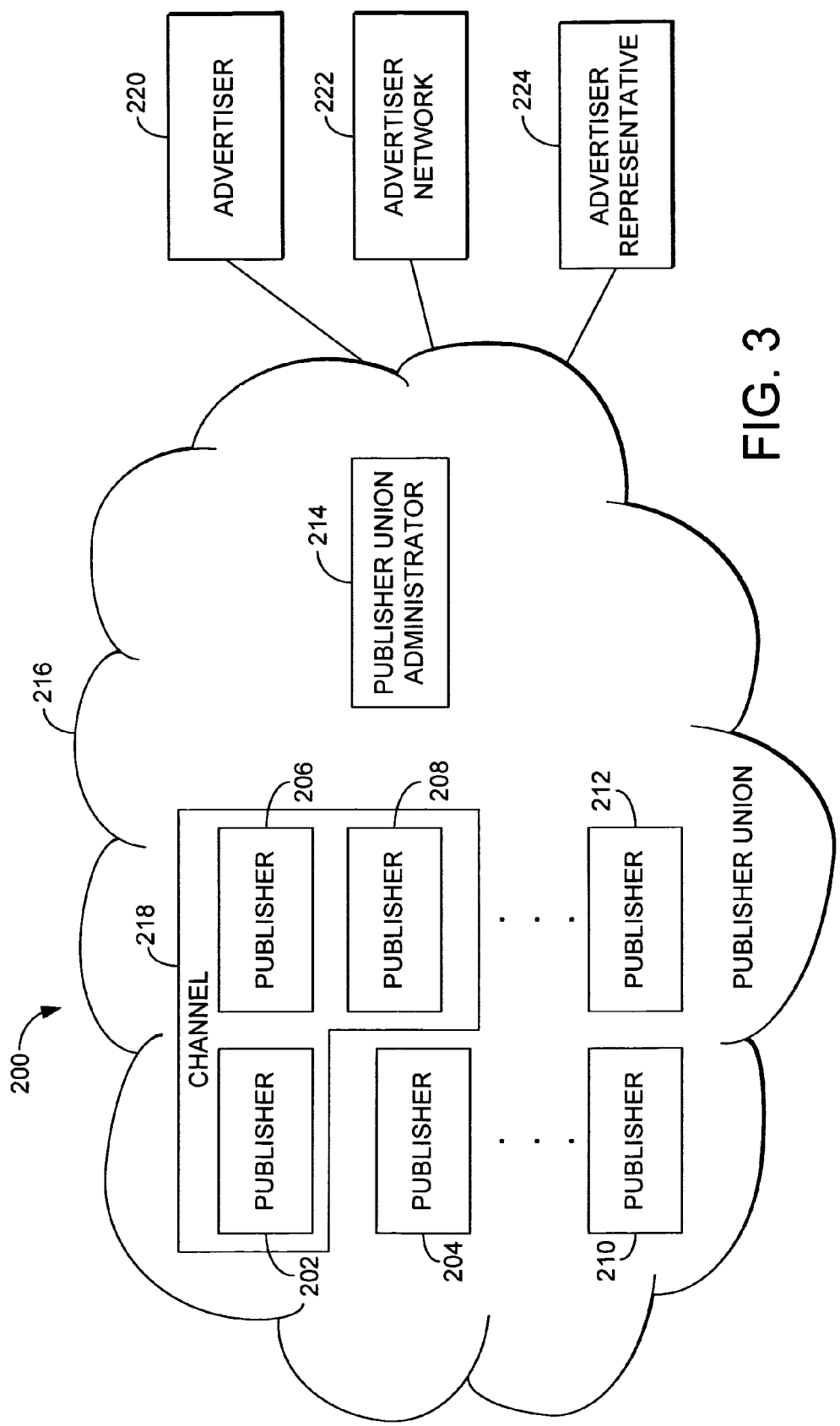
FIG. 3 is a diagram of a publisher union, according to embodiments of the present invention.

FIG. 3 is a diagram of a publisher union, according to embodiments of the present invention. FIG. 3 illustrates arrangement 200, where a plurality of publishers have grouped together to form publisher union 216. Publisher union 216 is a grouping of any number of publishers, and while six publishers (202, 204, 206, 208, 210, and 212) are illustrated, any number of publishers may join publisher union 216. For example, a publisher may choose a particular publisher union based on the amount of money that advertisers are paying for their channels. For example, if there was a union that specialized in sports sites, presumably there would be a lot of sports advertisers competing for sports content. A new sports publisher may want to join that union in order to take advantage of this competition and resulting higher prices. If a publisher comes in with a new channel, they might prefer a union based on the overall number of advertisers. In an embodiment, publisher unions may have different requirements on the quality, size, or viewership of the content pages. Not all publishers will be able to meet the quality requirements for the best publisher union, so second and third tier publisher unions may be created. In an embodiment, at least one publisher creates publisher union 216 and appoints publisher union administrator 214 to invite new members and remove undesirable members. In various embodiments, publisher union administrator 214 is any person(s) or entity with the capability of administering publisher union 216. However, in an embodiment, publisher union 216 is entirely virtual, in which case the duties of publisher union administrator 214 may be accomplished using software logic or artificial intelligence. The founding publisher also creates metadata about publisher union 216. The publisher union metadata describes the purpose of publisher union 216 in machine-readable format, e.g., XML. For example, one purpose may be adult content. Another example purpose would be children's content. Embodiments are not limited to any particular type of content. In an embodiment, the publisher union metadata also comprises impression volumes, user characteristics, quality definition (e.g., pages should not have Flash, should load within a specific timeframe, should have a certain amount of content, etc.), etc. In an embodiment, membership in a particular channel may be restricted to publishers meeting certain criteria.

Once a publisher union is formed and multiple publishers have joined, a publisher member or publisher union administrator may propose the creation of a channel by submitting a channel proposal. As illustrated in FIG. 3, publishers 202, 206, and 208 have formed channel 218. A channel is a subgroup within the publisher union that organizes multiple publishers by at least one common characteristic. In an embodiment, a channel may be formed based on common content, e.g., publishers of content about dogs may form a dog channel. In an embodiment, a channel may be formed based on common performance characteristics such as revenue, e.g., publishers of high value content may form a channel. In an embodiment, a channel may be formed based on user demographics, e.g., publishers of content that appeals to 18-24 year old men may form a channel. In an embodiment, a channel may be formed based on a keyword, e.g., publishers of content that relates to the keyword "television" may form a channel. In an embodiment, a channel may be formed based on relative content rating, e.g., publishers of content that is rated at least 4 out of 5 stars may form a channel. However, embodiments of the present invention are not limited to any characteristic in particular, as virtually any characteristic may be used as the basis of a channel. Also, multiple characteristics may be used, e.g., high value and dog content. In an embodiment, multiple channel proposals may be open at the same time in a publisher union. In an embodiment, publishers may restrict particular advertisements or advertisers. For example, a publisher may not want to display pornography, another publisher may not want to display ads from a competitor, etc.

In an embodiment, the channel proposal defines metadata about the channel, such as the common characteristic(s), minimum cost per thousand impressions (CPM), the URL of a website for the channel, minimum traffic, minimum number of unique users, minimum number of users meeting specific criteria (e.g., gender, industry, income, etc.), minimum dwell time per page, requiring that ads be displayed "above the fold" on pages, requiring that all pages have the same topic or a specific set of users, etc. However, embodiments are not limited to any specific composition of the channel proposal, as more, less, or different items may be included. If the channel is created, the metadata may evolve over time to incorporate historic performance of the channel, the success of particular advertisements, preferred advertisers, etc. The channel proposal is evaluated by the publishers in the publisher union, and if it is acceptable, the proposed channel is formed. In an embodiment, the determination is made by a vote of the publisher members of the publisher union. In an embodiment, the publisher union administrator administers the vote. In an embodiment, only certain publisher members may vote on a channel proposal. For example, there may be a minimum traffic threshold required for a publisher member to vote on a channel. In an embodiment, multiple channels may exist in a publisher union at the same time, and in an embodiment, a publisher may be a member of multiple channels at the same time.

Once a channel is created, the publisher union administrator presents the channel for monetization. As illustrated in FIG. 3, publisher union administrator 214 may present channel 218 to advertiser 220, advertiser network 222, and/or advertiser representative 224. In an embodiment, the channel is presented via auction with a reserve price. In an embodiment, the channel is presented to a preferred advertiser. On behalf of the publisher members of the channel, the publisher union administrator negotiates the terms of advertising on the channel. By combining with other publishers into publisher unions and channels, individual publishers do not have to individually negotiate with advertisers.

Figure 4:
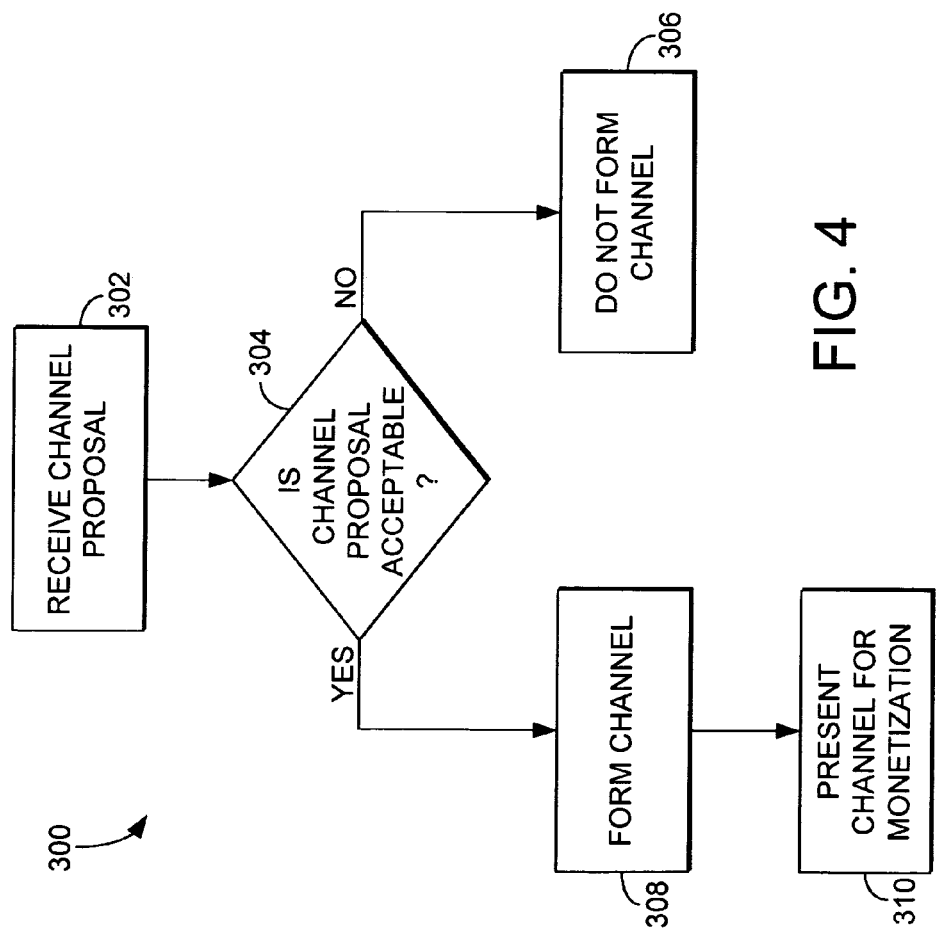
FIG. 4 is a flowchart of the creation of a channel, according to embodiments of the present invention.

FIG. 4 is a flowchart of the creation of a channel, according to embodiments of the present invention. Method 300 begins with a channel proposal being received (302). A determination is made whether the channel proposal is acceptable (304). If the channel proposal is not acceptable, no channel is formed (306). If the channel proposal is acceptable, a channel is formed (308) and presented for monetization (310).

Figure 5:
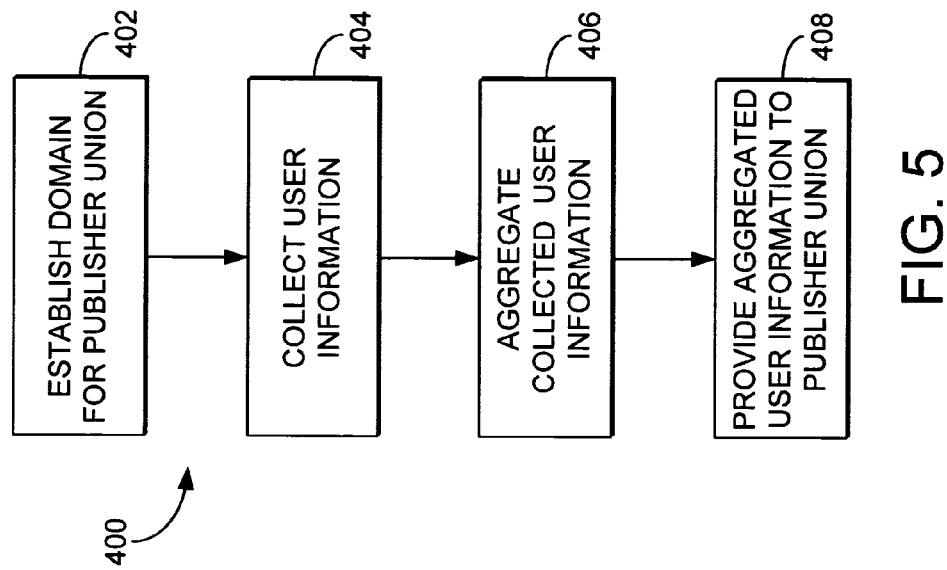
FIG. 5 is a flowchart of the collection of user information, according to embodiments of the present invention.

In an embodiment, publisher unions may be used to aggregate user information and share with union members to facilitate user tracking, data gathering, etc. With the aggregated user information, members of the publisher union may tailor a user experience to a particular user, offer value-added services to a particular user, etc., by creating a more complete list of information about each user. FIG. 5 is a flowchart of the collection of user information, according to embodiments of the present invention. Method 400 begins with the establishment of a domain for a publisher union (402). Once a domain is established, members of the publisher union can use the domain, for example, to set cookies on a user computer that are in the name of the union domain. In an embodiment, the cookies are tracking cookies. However, embodiments of the present invention are not limited to tracking cookies. For example, data gathering cookies may also be set, e.g., to store user characteristics and behavior. Further, user tracking is possible without cookies, in embodiments of the present invention. When a user accesses one of the publisher union members' website, user information is collected (404). The collected user information is aggregated (406) and provided to the members of the publisher union (408). In an embodiment, a data store is used by the publisher union such that the members of the publisher union are able to access the data store to retrieve the aggregated user information.

In an embodiment, a publisher union, comprises a plurality of publishers, a plurality of channels, each channel comprising at least two of the plurality of publishers, and a publisher union administrator to present each channel for monetization. In another embodiment, a method of gathering user information, comprises establishing a domain for a publisher union, collecting user information when a user accesses one of a plurality of publisher members of the publisher union on the domain, aggregating the user information, and providing the aggregated user information to the plurality of publisher members of the publisher union. In yet another embodiment, a method of administering a publisher union, comprises receiving a channel proposal from at least one of a plurality of publisher members of a publisher union, determining whether the channel proposal is acceptable to the plurality of publisher members of the publisher union, forming a channel based on the channel proposal, wherein the channel comprises at least two of the plurality of publisher members of the publisher union, and on behalf of the publisher union, presenting the channel for monetization.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of forming a publisher union by utilizing a processor to implement the method comprising:
    creating a publisher union, wherein the publisher union comprises a plurality of member publishers organized together to effectively improve their negotiating position, wherein the plurality of member publishers of the publisher union are organized based on criteria;
    employing the processor to create metadata in a machine-readable format that comprises the criteria for membership in the publisher union;
    appointing a publisher union administrator to manage the publisher union by inviting other publishers to join the publisher union based on the criteria and by removing undesirable member publishers of the plurality of member publishers based on the criteria, wherein the publisher union administrator is appointed by one or more of the member publishers;
    receiving from one of the plurality of member publishers a channel proposal at the publisher union that proposed the creation of a channel, the channel represents a sub-group within the publisher union that organizes at least two of the plurality of member publishers by at least one common characteristic of content of web pages managed by the at least two of the plurality of member publishers; and
    presenting the channel to advertisers for monetization, wherein the process of presenting comprises:
        (a) negotiating on behalf of the plurality of member publishers in the sub-group associated with the channel as a group; and
        (b) binding each of the plurality of member publishers in the sub-group associated with the channel to terms of the negotiation.

2. The method of forming a publisher union of claim 1, operating a domain that tracks user information and shares the user information with the publisher union.

3. The method of forming a publisher union of claim 1, further comprising restricting membership of one or more of the plurality of member publishers to the channel based on the at least one common characteristic.

4. The method of forming a publisher union of claim 1 further comprising determining whether to create the channel by certain publisher members of the plurality of member publishers voting on the channel proposal.

5. The method of forming a publisher union of claim 1, wherein the publisher union administrator creates the channel, monetizes the channel to one or more advertisers, and negotiates terms of advertising.

6. Computer storage-media having computer-executable instructions thereon that, when executed perform a method of gathering user information, the method comprising:
    providing a publisher union, wherein the publisher union comprises a plurality of member publishers organized together to effectively improve their negotiating position, and wherein each of the plurality of member publishers meets content requirements determined by a founding publisher;
    establishing a domain for the publisher union, wherein the domain tracks a user accessing the domain;

collecting user information when the user accesses one of a plurality of member publishers of the publisher union on the domain;

aggregating the user information;

utilizing the aggregated user information to develop a channel, the channel represents a sub-group within the publisher union that organizes at least two of the plurality of member publishers by at least one common characteristic within the aggregated user information;

negotiating on behalf of the plurality of member publishers in the sub-group associated with the channel as a group; and binding each of the plurality of member publishers in the sub-group associated with the channel to terms of the negotiation.

7. The method of claim 6, wherein the user information is collected using at least one cookie.

8. The method of claim 7, wherein the at least one cookie is used to track the user's activity.

9. The method of claim 7, wherein the at least one cookie is used to gather data about the user.

10. Computer-storage media having computer-executable instructions thereon that, when executed, perform the operations recited in claim 7.

11. A method of administering a publisher union, wherein the method is embodied on computer-executable instructions that, when executed by a processor, performs the method comprising:

receiving a channel proposal from at least one of a plurality of member publishers of a publisher union, wherein the publisher union comprises a sub-group of the plurality of member publishers joined together by choice to effectively improve their negotiating position by appointing a publisher union administrator to negotiate on behalf of the publisher union;

determining whether the channel proposal is acceptable to the plurality of member publishers of the publisher union;

utilizing the processor to form a channel based on the channel proposal, wherein the channel comprises at least two of the plurality of member publishers of the publisher union; and on behalf of the publisher union, presenting the channel to one or more advertisers for monetization, wherein the process of presenting comprises:

(a) negotiating on behalf of the plurality of member publishers in the sub-group associated with the channel as a group; and (b) binding each of the plurality of member publishers in the sub-group associated with the channel to terms of the negotiation.

12. The method of claim 11, wherein the channel groups multiple member publishers of the plurality of member publishers by at least one common characteristic.

13. The method of claim 12, wherein the channel restricts membership of the plurality of member publishers thereto based meeting the at least one common characteristic, wherein the at least one common characteristic is common content presented by the multiple member publishers of the channel.

14. The method of claim 11, wherein the presenting of the channel for monetization comprises guaranteeing a minimum click-through rate.

15. The method of claim 11, wherein the acceptance of the channel proposal is determined by certain publisher members of the plurality of member publishers voting on the channel proposal.

16. Computer-storage media having computer executable instructions thereon that, when executed, perform the operations recited in claim 11.

17. The method of forming a publisher union of claim 1, further comprising:

forming the channel based on the common content of the web pages managed by the at least two of the plurality of member publishers;

grouping publishers from the plurality of member publishers for membership into the channel;

restricting membership of the channel based on historic performance characteristics of each of the grouped publishers.

18. The method of forming a publisher union of claim 1, further comprising restricting an advertiser from being presented the channel for monetization based on advertising content of the advertiser.

19. The method of forming a publisher union of claim 17, further comprising restricting membership of the channel based on historic performance of the channel.

* * * * *